Nov. 8, 1966 M. E. LIPPMAN 3,284,682
CONTROLLED ENVIRONMENT CAPACITIVE ELEMENT
Filed March 16, 1964
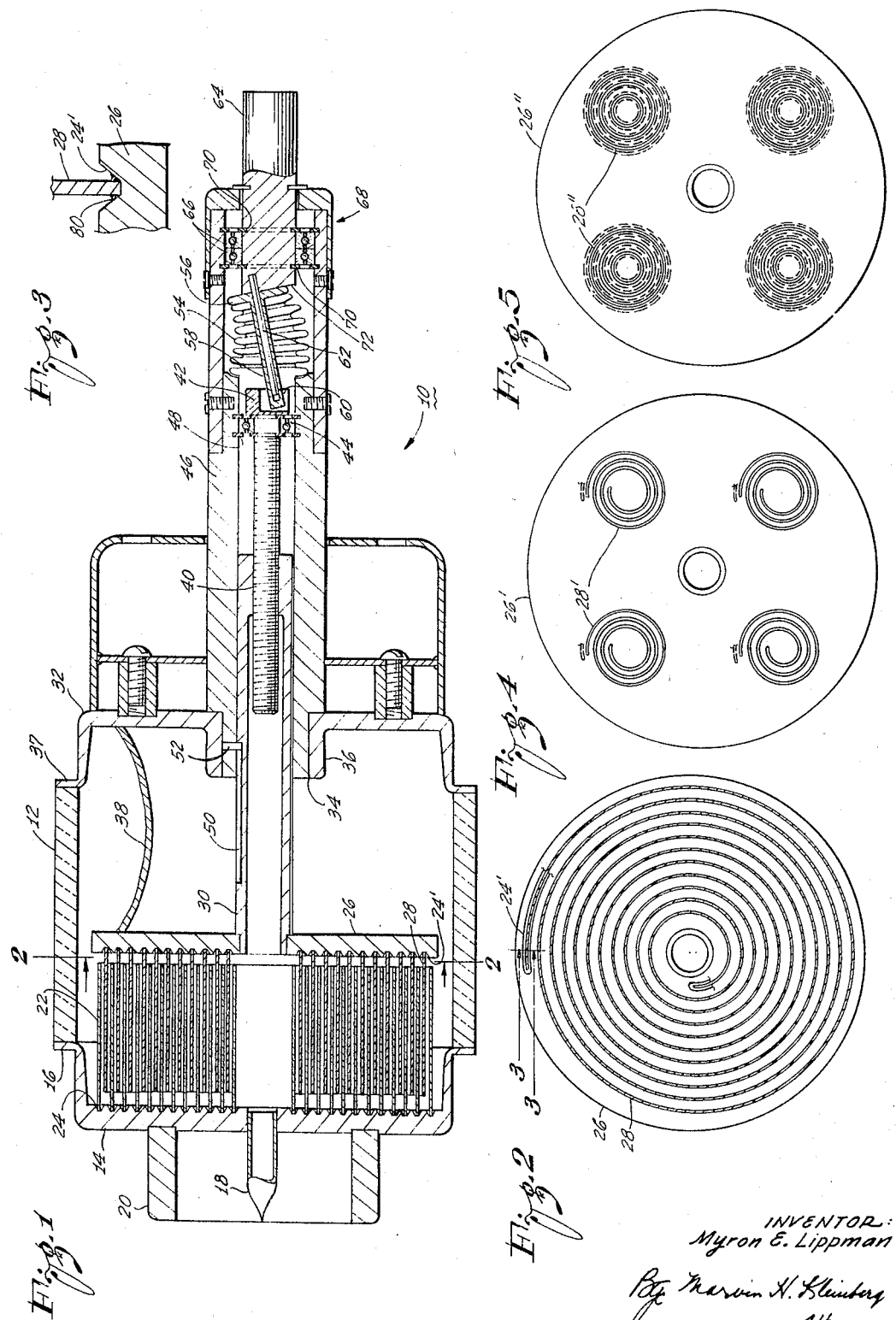
INVENTOR:
Myron E. Lippman
By Marvin H. Kleinberg
Attorney

United States Patent Office 3,284,682
Patented Nov. 8, 1966

3,284,682
CONTROLLED ENVIRONMENT CAPACITIVE
ELEMENT
Myron E. Lippman, Los Angeles, Calif.
(117420 Nordhoff St., Northridge, Calif.)
Filed Mar. 16, 1964, Ser. No. 352,196
2 Claims. (Cl. 317—245)

This invention relates to variable or adjustable capacitors and, more particularly, to variable or adjustable capacitors capable of functioning for extended periods under heavy power loads at extremes of voltage and current.

It is often desirable to vary widely the capacitive impedance of a capacitor for "tuning" a circuit, in response to a change within a system, in response to a received signal, or for some other reason. Quite often, such a capacitor is used in circuits carrying large currents at high frequencies and in which large voltage differentials are applied between capacitor plates. Obviously, such uses require close control of the operating environment if corona discharge and other undesirable effects are to be avoided. Accuracy of fabrication and proper operating atmosphere are two important factors in controlling environment and are, thus, desiderata of such variable capacitors.

Variable capacitors with vacuum, liquid, or gaseous environments or atmospheres surrounding the plates have been found to operate in a relatively satisfactory manner in conventional circuit arrangements. However, in situations in which they are subjected to substantial and relatively continuous mechanical and electrical use, for example, in extremely high power microwave systems, and are varied in response to the operation of a servomechanical system to control high frequency signals, known capacitors of economical construction break down within a short time, disabling the associated system.

Malfunctions generally occur because of the inherent weaknesses for specialized uses of conventional variable capacitors. Such capacitors normally include some form of bellows arrangement which expands and contracts with movement of the capacitor plates to seal those plates within the vacuum or controlled gaseous atmosphere required for high frequency, high current operation. The bellows is also used to conduct current as the means of electrical connection between the movable plate and the fixed plate.

Constant expansion and contraction of bellows arrangement with the movable plates causes such bellows arrangements to break down with consequent malfunctioning of the capacitor. This is especially true of capacitors constructed with metallic bellows arrangements, due to mechanical stress of the bellows, electrostatic stresses in the dielectric and the stresses and strains imparted by thermal changes in the material while conducting circuit currents.

Moreover, wear on the precisely constructed operating parts controlling the variation of capacitance may soon eliminate the required accuracy thereby distorting capacitance values or the tuning mechanisms, limiting the usefulness of the variable capacitor. Other problems of design also limit the usefulness of conventional variable capacitors for the projected use. Often, unprotected mechanical parts corrode and lose all semblance of precision or adjustment.

In many conventional arrangements, the bellows are so closely adjacent the capacitor plates that they are affected detrimentally by the discharges which may sometimes occur. A mayor difficulty of all high power capacitor fabrication is attaining sufficient accuracy. Often manufacturing distortions cause early breakdown.

One arrangement which has proven feasible for fast or continuous operation is described in the patent to J. E. Jennings, Patent No. 2,883,593, issued April 21, 1959, which does not require a bellows but rather includes a portion of a drive motor within the sealed vacuum shell for varying a capacitor within the same shell. The field windings and the electrical connections thereto are wholly outside the shell and the capacitor can be varied without disturbing the controlled atmosphere maintaining the operating elements. However, even this device uses a flexible diaphragm member which is axially stressed. Further, the device is only feasible in situations to which the particular motor is adapted; it cannot be conveniently varied to new uses (e.g., the capacitor cannot be used with conventional servo motors) and is many times more expensive than conventional variable capacitors.

Still another problem encountered in the fabrication of high frequency, high power capacitors, is the fabrication of the individual capacitor plates themselves. For example, a typical structure described and shown in a patent to Jennings, No. 2,957,113, issued October 13, 1960, teaches a plurality of cylindrical "plates," each of which is shaped on one open end by a spinning operation to form a short inwardly extending radial flange. A plurality of these cylindrical plates is then mounted in a jig or fixture to maintain concentricity and the plurality is welded to a back plate, using, in this particular embodiment, spot-welding techniques.

In order to simplify the production of capacitor plates, according to a preferred embodiment of the present invention, the base plate structure is provided by the machining or coining of a spiral groove into a back plate. A sheet of flat, relatively thin plate is formed into a spiral by mounting one lateral edge of the sheet in the spiral groove in the plate. Once in place, the structure can be welded, brazed, or otherwise fastened or adhered to the plate. In this embodiment, it is unnecessary to fabricate a plurality of cylindrical sections, since a single, continuous sheet will suffice. Alternatively, the spiral plate structure may be held in a suitable fixture and fastened to a mounting plate without the need for providing a groove.

The spiral configuration offers the added advantage of limited, "fine" tuning in addition to the normal "tuning." Since oppositely wound spirals are formed on the facing plates, rotation of one relative to the other tends to narrow the separation between the "plates" as well as the normal axial displacement which varies the effective surface area of the capacitor.

In an alternative embodiment of the invention, the base plate is provided with a plurality of concentric grooves and a plurality of cylindrical plates is formed from flat stock which are rolled into cylinders and seam-welded. The spinning operation is thereby avoided and the individual cylinders can be fitted into the corresponding circular grooves without requiring extensive aligning fixtures. Once in the grooves, many techniques are available for securing the cylinders into place, such as welding, brazing, or the use of conductive, epoxy resins.

In yet another embodiment, cylindrical plates can be fabricated from seamless tubing of suitable diameter which is cut to the proper axial length and then fitted into the machined, concentric grooves for susbequent fastening by any of the many available techniques. Alternatively, a jig or fixture may support the concentric cylinders and they may be directly fastened to a plate without grooves.

Also in accordance with the present invention, a variable capacitor is provided with unique, limited movement, sealing elements to maintain controlled environments for capacitor plates and internal elements. The plate construction allows non-distorting fabrication techniques to be used for attaining accuracy. The limited movement elements are relatively insensitive to wear and, thus, facilitate long capacitor life.

The limited axial movement is accomplished in a preferred embodiment, by a cam-like bellows mounted transmission element which transmits rotational forces without itself rotating and which does not expand and contract along its length. Inasmuch as the sealing element maintains a substantially constant volume, the torque necessary to adjust or vary the capacitor is independent of the setting of the capacitor and is not affected by elastic expansion of the sealing element. Such an arrangement allows the capacitor to be fabricated so that the operating parts which determine accuracy and precision are all within the controlled environment and are protected against corrosion.

In addition, since independent current carrying means are provided, the sealing elements are not subjected to thermal or electrical stresses, lengthening the useful life thereof.

In other alternative embodiments, a more rugged, high power capacitor can be provided by utilizing, on the fixed and movable base plates, a plurality of sets of capacitor plates, which may either be spiral or circular in configuration. While each corresponding, opposing pair of conductive plates of each set is coaxial and concentric, the plurality of sets are only axially parallel. Such a structure lends itself well to an extremely wide range of capacitance values by proper selection of the number and size of plate elements to be used in the finished capacitor.

Accordingly, it is an object of the present invention to provide an improved, controlled environment variable capacitor.

Another object of the present invention is to provide a rugged, variable capacitor capable of high voltage, high current and high frequency operation.

Yet another object of the present invention is to provide an improved capacitor in which the spatial volume of the controlled environment remains substantially constant throughout the adjustment range.

It is yet another object of the invention to provide a variable capacitor in which the actuating torque required for varying the capacitance value is substantially constant throughout the adjustment range.

It is an additional object of the invention to provide an improved high voltage, high current variable capacitor in which the controlled environment sealing elements are substantially isolated from the current carrying elements.

An additional object of the invention is to increase the accuracy and useful life of controlled-atmosphere, variable capacitors.

Another object of the invention is to provide a capacitor, adjustable to various settings for different circuits.

A further object of the invention is to reduce the effect of mechanical and electrical operations of a variable capacitor on its characteristics.

Yet another object of the invention is to provide an inexpensive, constant volume controlled-environment, variable capacitor fabricated to be substantially insensitive to wear as compared to conventional variable capacitors.

It is still another object of the present invention to provide a simplified plate structure for a capacitor.

It is still another object of the invention to provide a capacitor having a spiral plate structure.

It is yet another object of the present invention to provide an improved capacitor plate structure in which seamless tubing can be utilized.

It is still a further object to provide a capacitor plate formed by edge fastening a sheet of substantially plate stock in a spiral configuration.

Various other advantages also accrue due to the unique construction of the capacitors of the invention. These advantages, other objects, and features of this and other embodiments of the invention will be better understood from the following detailed explanation taken together with the drawings. In the drawings, like designations have been used for like elements of the different figures.

In the drawings:

FIGURE 1 is a cross-sectional view of a preferred embodiment of a controlled-environment variable capacitor in accordance with the invention;

FIGURE 2 is a sectional view of the capacitor of FIG. 1 taken along the line 2—2 in the direction of the appended arrows, especially illustrating the construction of the capacitor plates;

FIGURE 3 is a partial cross-sectional view of a portion of the capacitor plate of FIG. 2, taken along the line 3—3 in the direction of the appended arrows;

FIGURE 4 is an end view of one capacitor plate of an alternative more rugged embodiment of the invention in which a plurality of plate sets are mounted on the base plate; and FIGURE 5 is an end view of another rugged, variable capacitor, similar to that of FIG. 4 in which sets of cylindrical plates are employed.

In FIGURE 1, of the drawings there is shown a variable capacitor 10, in accordance with the invention. The capacitor 10 comprises a body portion 12 of hollow cylindrical form which may be constructed of a rigid insulating material such as alumina. A disk-like, fixed conductive base plate 14 covers one end of the cylinder formed by the member 12 and includes a cup shaped portion, flanged to abut the member 12. The flange 16 is affixed to the member 12 by conventional means such as one of the adhesives used for forming a vacuum-tight or gas-tight seal.

A pinched off tubulation 18 which projects centrally through the plate 14 is used in the fabrication of the capacitor 10 for evacuating the interior of the cylinder formed by the aforementioned elements. The tubulation 18 is covered by a mounting ring 20 which protects the tubulation 18 from fracture with consequent contamination or other interference with the vacuum, liquid, or gaseous atmosphere within the cylinder. The mounting ring 20 in the preferred embodiment comprises a metallic conductor for making electrical connection to the fixed plate 14. Alternatively, the mounting ring 20 may be made of a non-conductive material, and conductive connections to the end plate 14 may be made in another well-known manner.

The end base plate 14 mounts a fixed plate member 22 which determines the surface area of the variable capacitor. The plate member 22 is formed of a conductive material appropriate to the specific capacitor and is mounted in a spiral groove 24 in the face of the fixed base plate 14. Preferably, the groove in the base plate is accurately machined in the form of an Archimedes' spiral. Alternatively, stamping or casting or coining techniques may be used to facilitate production.

The plate member 22 may be a rectangular piece of flat stock fashioned into the spiral and placed within the groove 24 and accurately held therein by any of a number of well known means. For example, the plate 22 may be held by a pressure fit within the groove 24 in the base plate 14, by a conductive adhesive, by a solder contained within the groove, by spot welds applied to the back of the plate 14, or by welding or brazing techniques.

Tough relatively simple in construction, the machined or cast groove 24 and the plate member 22 positioned therein allow the extreme accuracy necessary for high voltage and high current use at high frequencies. Thus, even after substantial use of the device in rugged environments, the plates 22 maintain their positions very accurately. Furthermore, the groove retention technique tends to eliminate rough spots due to welding which may provide projections sufficient to induce corona discharges.

A second, movable disc-like metallic plate 26 is mounted parallel to the base plate 14 and carries a similar plate member 28. The plate member 28 is affixed to a groove 24' in the plate 26 in a like manner to that in which the plate member 22 is affixed.

The spirals on the facing surfaces of the end plate 14 and the movable plate 26 are pitched, in a sense, oppositely so that the capacitance determining surfaces of the plate members 22, 28 interleave without touching.

In operation the axial separation between the fixed plate member 22 assembly and the movable plate member 28 assembly in the usual variable capacitor may be as much as two inches. This axial movement is accomplished by the movement of an internally threaded actuating shaft 30 back and forth axially within the body member 12. The actuating shaft 30 carries the movable plate 26 and positions it such that the plate members 22, 28 define differing areas of plate surface. The shaft 30 is supported coaxial with the body member 12, the end plates 14 and 26, and the capacitor plate members 22, 28 by an end piece 32 which has a centrally located hole 34 and a projecting sleeve portion 36. The end piece 32 may be of a rigid metallic material and may be affixed to the body portion 12 by means of a mounting flange 37 which can be sealed by an adhesive or other method as pointed out above.

In the embodiment shown in FIGURE 1, a conductive strap 38 is connected between the movable plate 26 and the end piece 32 to provide a low resistance path for conducting electricity therebetween so that an external connection can be made to the movable plate 26, without relying on the conductive path through the actuating elements. As pointed out above, the tubulation 18 provides a means for evacuating or filling the interior space occupied by the capacitor plate members 22, 28 such that high frequency, high current and high voltage use may be made thereof. The interior space is defined by body member 12, the fixed base plate 14, and the end piece 32.

To preclude the dissipation of the protective internal enviroment which may be a vacuum, an inert gas or a liquid dielectric medium, generally referred to herein as a fluid, an enclosing arrangement is provided within the operating portion of the capacitor 10. Since the actuating shaft 30 is affixed to and moves the movable plate 26, its hollow interior is threaded to ride on an actuating screw 40 which has its head 42 supported by a ball bearing set 44. The set 44, in turn, is supported within a bushing guide 46, and is held in place with retaining rings 48 mounted in grooves in the guide 46. As the screw 42 turns without axial movement, it drives the actuating shaft 30 axially within the body member 12 of the capacitor 10 to vary the capacitance thereof. As may be seen, a groove 50 is provided in the surface of the actuating shaft 30 in which a pin 52 rides to maintain the actuating shaft 30 in a limitedly rotatable position. The groove 50 therefore extends for a selected angle around the circumference of the shaft 30. The pin 52 rides between the two ends of the groove 50 and thus limits the axial excursion of the plate members and the capacitance of the capacitor 10.

As the screw 40 is rotated, this rotational motion is transmitted to the threaded shaft 30 which in turn rotates until restrained by the pin 52 in the groove 50. Additional rotation of the screw 40 is then translated to axial motion of the threaded shaft 30 which is then a captive nut on the screw. Continued rotation of the screw 40 in the same direction positions the fixed and movable plates axially with respect to each other until the approximate desired value of capacitance is obtained. A reversal of the rotation of the screw 40 then rotates the shaft 30 until the pin 52 engages the opposite wall of the groove 50. In this fashion, the separation between the surfaces of adjacent plates in a radial direction can be infinitely varied. It is clear that symmetrical, oppositely wound spirals, if interleaved and rotated relative to each other, will coincide.

Therefore, fine adjustment can be made by first locating the plates axially for the optimum value and then reversing rotation of the shaft to change the degree of interleaving of the spirals. These two levels of adjustment, in total, allow wide variation of capacitance with very little mechanical movement of the varying arrangement. Thus, capacitor protection is enhanced and breakdown is substantially negated.

To maintain the fluid-tight seal around the entire interior space of the capacitor 10, a sealing member, here a bellows member 54 having a generally cylindrical form and lying coaxially with the body member 12 and the screw 40 is positioned to be adjacent the screw head 42 and bearing set 44. The bellows member 54 may be constructed preferably of one of a number of resilient materials such as metals. Plastic materials having similar properties may be utilized in low vacuum applications, but are generally not suitable for high vacuum internal environments.

One end of the bellows member 54 is affixed to the end of the bushing guide 46 by means such as an adhesive to provide the appropriate vacuum or fluid-tight seal.

The other end of the bellows member 54 is affixed to a cap member 56 which carries a hollow shaft 58 extending into the interior of the bellows 54. The hollow shaft 58 is sealed at the inner end to maintain the integrity of the sealing system. A driving cup 60 is eccentrically positioned on the face of the screw head 42.

The hollow shaft 58 is mounted to ride in the driving cup 60. A driving dog 62 is connected to a driving shaft 64, which is adapted to be rotated externally to adjust the capacitance of the capacitor 10. The driving shaft 64 rides in a set of ball bearings 66 carried by an input assembly 68 affixed to the bushing of guide 46 by means such as screws, rivets or pins thereto. The axial movement of the shaft 64 is limited by a ring set 70 therein which bears against the ball bearing set 66.

The driving dog 62 extends centrally within the hollow shaft 58. The driving dog 62 is mounted at an angle to the axis and is adapted to seat the hollow shaft 58 in the driving cup. The inner surface 72 of the driving shaft 64 is normal to the driving dog 62 and is positioned to abut against the cap member 56.

As the shaft 64 is rotated to adjust the capacitance, the driving dog 62 oscillates in a circular path and causes the cap 56 to oscillate in the same circular path. The hollow shaft, being driven by the driving dog 62 applies a rotational force on the screw head 42 via the coupling with the driving cup 56. This action is permitted by the bellows member 54 which has substantial cross-axis freedom. However, the bellows member 54 is limited to a very slight axial motion, resulting only from the "rocking" imparted during the oscillation of the driving dog 62 in the hollow shaft 58. As a matter of fact, the axial movement of the bellows 54 may be roughly one-hundredth of an inch, and the arcuate movement about one-eighth of an inch in order to move the capacitor plate through a total axial distance of two inches.

Due to this restricted movement and due to the extensive portion of bellows 54 which is capable of absorbing this movement, very little wear occurs to the bellows 54 during continued, punishing use of the capacitor 10. This is true even though the use may be such as that described above in which the capacitor 10 is continually driven in response of the operation of a servomechanical motor. This construction which eliminates axial movement is particularly important for the major cause of failure, in prior art capacitor, is in bellows subjected to axial excursions. By use of such an arrangement the same size bellows may be used for any degree of axial movement. Furthermore, the torque for movement is constant throughout the range of the movement, a boon to servomechanical uses.

Additional advantages of the capacitor 10 shown in FIGURE 1 should also be considered. For example, all of the elements which perform the operational functions and to which wear might occur are positioned within the controlled environment. Thus, corrosion due to the external atmosphere cannot affect the accuracy of the threading of the screw 40, the threading of the actuating shaft 30, the alignment of the cylindrical sleeve 36, or the positioning of the plate members 22, 28.

It has been determined after much experimentation that a substantial amount of the wear actually received by variable capacitors of the prior art is due to their exposure to the normal or even hostile environments and their corrosion thereby. The capacitor of FIGURE 1 precludes this corrosion and maintains the accuracy of its interior elements long after other conventional capacitors have worn beyond use.

A special advantage of the spiral cylinder plate members 22, 28 resides in the ease with which accurate alignment and assembly may be accomplished. A single plate rather than a plurality of plates may, obviously, be quickly arranged in place during the fabrication process.

Furthermore, a groove of the type shown may be accurately machined or cast in very rapid fashion so that the entire fabrication is shortened and rendered more accurate.

Further, the capacitor of the invention is arranged to provide two degrees of tuning. For example, gross or rough tuning is accomplished by the normal (to this invention) arrangement which allows direct axial (piston-like) movement so that the overlapping portions of the capacitor plate members 22, 28 may be widely varied. Vernier or closing tuning is accomplished by the restricted rotation of the movable plate member 28 relative to the fixed plate member 22.

Turning next to FIG. 2, there is shown the spiral cylindrical plate member 28 mounted upon the movable plate 26. Also shown is a groove 24' in which the plate member 28 is mounted on one edge. The positioning of plate member 28 in groove 24' is better seen in connection with FIG. 3, which is an enlarged close-up view of the groove 24' showing the plate member 28, edge mounted thereon. Indicated in FIG. 3 is an adhesive 80 which may be solder, welding or brazing material or an adhesive suitable for use in the capacitor application.

It is understood of course that in alternative embodiments, it may be desired to edge mount a plate member directly to the surface of the end plates without first providing the groove therein. This is also possible and can be done with the assistance of more complex, closer tolerance jigs and fixtures.

In FIG. 4, there is shown an alternative embodiment of the present invention, expressly designed for rugged, heavy duty use in which heavy current loads at high voltages may be anticipated for long periods of time, and in which the plate area is to be substantially less than in the preferred embodiment. FIG. 4 may be considered the movable plate 26' of a variable capacitor similar in construction to that of FIG. 1. It will be readily appreciated however that a fixed plate member 14' (not shown) is provided with a plate member structure corresponding to and cooperating with movable plate 26'. As shown in FIG. 4, the capacitor plate member arrangement includes a plurality of concentric spiral plate members 28' made in accordance with the principles of the present invention set forth hereinabove. Of course the plate members on the fixed end plate 14' will be oppositely wound spirals that are positioned to be coaxial with the spirals of FIG. 4 so that axial motion of the movable plate 26' causes an interleaving fit of the opposing plate members.

The capacitor of FIG. 1 is further modified for this embodiment by restricting the groove 50 in which the restraining pin 52 rides, to a width substantially equal to that of pin 52. Rotational motion of the plates 26' is thereby prevented and motion is limited strictly to the axial direction.

Turning next to FIG. 5, there is shown still another embodiment of the plate structure of FIG. 4 in which a plurality of circular concentric cylinders 28'' are edge mounted on the plate 26'' to serve the function of capacitor plate members. In the embodiment of FIG. 5 and in similar embodiments, the circular plate members 28'' are quite easy to mount and, if grooves are employed for mounting purposes, circular grooves are easily provided, either by machining, stamping, or other methods.

Further, it is well within the scope of the present invention to utilize a plurality of circular cylindrical plate members as in the prior art. The advantage of the present invention would be the ability to utilize flat stock which can be seam welded or the use of seamless tubing cut to the proper length, or, alternatively prior art flanged plate members could be directly employed.

It will be noted, however, that in the embodiments involving circular cylindrical plate members, if uniform spacing is desired for maximum utilization of plate area, then the concentric cylinders of one plate should be of radii $x+r$, $x+3r$, $x+5r$ ... $x+(2r-1)$. On the opposite plate, the radii would then be $x$, $x+2r$, $x+4r$, $x+6r$ ... $x+2nr$ where "$r$" is the uniform increment of spacing between adjacent, opposite cylinders when the movable plate member is closest to the fixed end plate, and "$x$" is the radius of the smallest cylinder.

All in all, the capacitors herein disclosed are, due to their solid, generally metallic body construction, much more rugged devices than conventional devices of like type. They are not subject to the wear of conventional devices, maintain their accuracy much longer, are simple and easier to construct, and are, in general, more precise.

The plate structures are easily fabricated, comprising in one embodiment single metallic sheets which are mounted in a spiral groove or, alternatively, a plurality of concentric cylinders mounted in grooves in base plates. The devices appear to be the only variable capacitors known which are relatively insensitive to wear in servomechanical uses. Furthermore, even with the above-enumerated advantages, the capacitors of this invention are less expensive than conventional devices.

Capacitors built in accordance with this invention have been tested and have been found to be capable of carrying up to 150 amperes of current at frequencies of up to 30 mc./s. These capacitors have proved capable of relatively unlimited use.

Since obvious modifications may be made to the capacitors of this invention by those skilled in the art without departing from the spirit and scope of the invention, I intend to be limited only by the appended claims.

What is claimed is:

1. A variable capacitor comprising: a pair of capacitor plates;

envelope means for maintaining a selected environment surrounding said plates;

tuning means for varying the area of said pair of plates adjacent one another, said tuning means comprising a threaded shaft adaptable for rotation affixed to one of said plates;

first rotating means adapted to rotate with respect to said envelope and to engage said threaded shaft for moving said shaft axially;

an envelope sealing means eccentrically coupled to said first rotating means including bellows means connected to said envelope means and a sealed hollow shaft extending interiorly through said bellows means to engage said first rotating means;

and second means including a driving dog, eccentrically coupling said sealed hollow shaft to a source of rotational motion for causing said sealing element to oscillate radially and for causing said first means to rotate for moving said shaft and the affixed one of said plates in an axial direction.

2. A variable capacitor as in claim 1 in which said plates include a support member and respectively counterwound spiral plate members in axial alignment and each of said plate members comprising a sheet of material mounted along one edge to form a cylindrical spiral.

References Cited by the Examiner

UNITED STATES PATENTS

| | | | |
|---|---|---|---|
| 1,563,440 | 12/1925 | Russell | 317—252 |
| 2,344,238 | 3/1944 | Finch | 317—245 X |
| 2,920,255 | 1/1960 | Luft | 317—251 X |
| 2,930,952 | 3/1960 | Glauber | 317—251 X |

FOREIGN PATENTS 646,215  7/1928  France.

LARAMIE E. ASKIN, *Primary Examiner.*

JOHN F. BURNS, *Examiner.*

D. J. BADER, *Assistant Examiner.*